No. 628,876. Patented July 11, 1899.
W. H. WALL.
APPARATUS FOR HANDLING COAL.
(Application filed Feb. 7, 1899.)
(No Model.) 5 Sheets—Sheet 4.
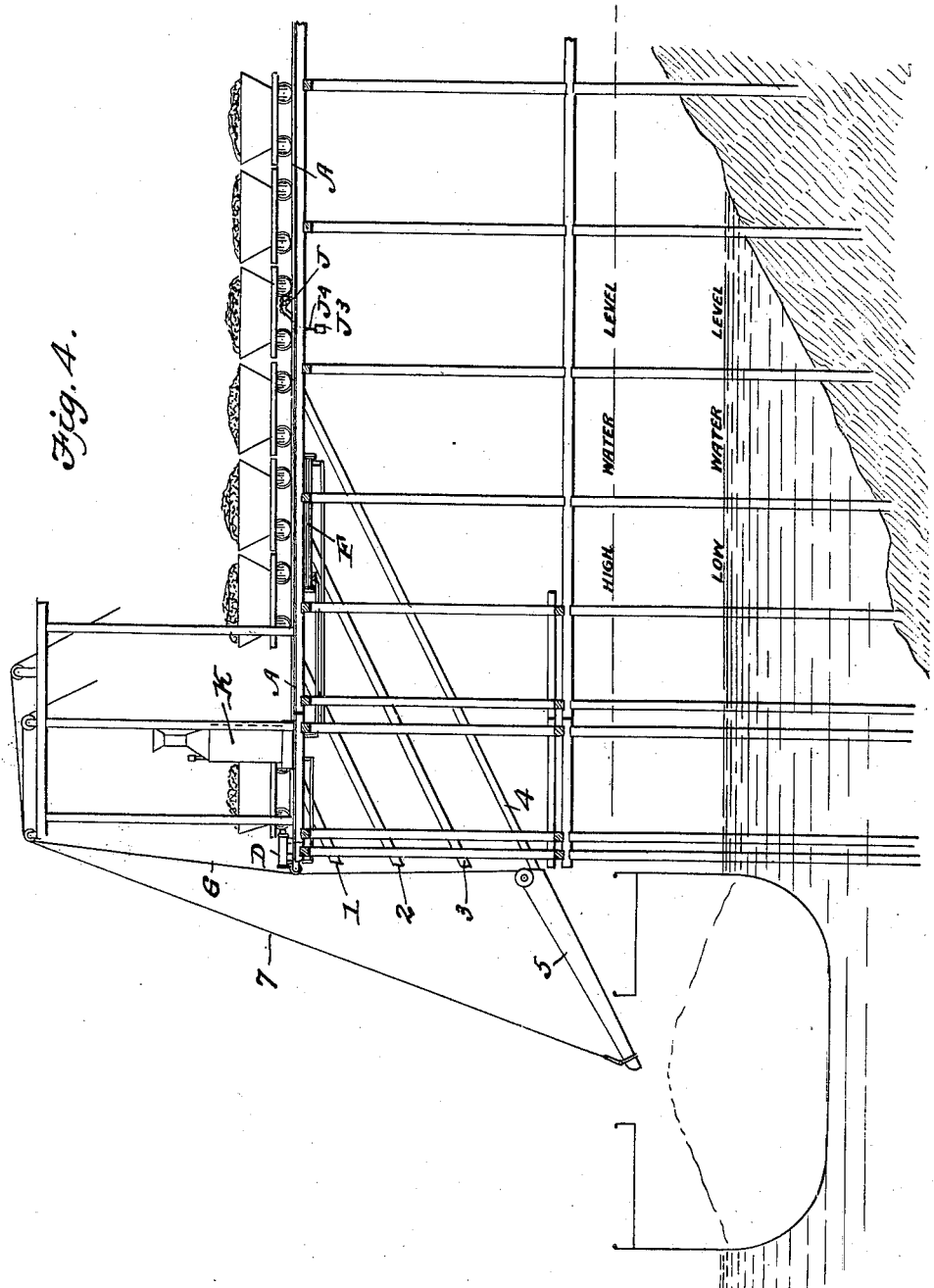
WITNESSES:
M. B. Blondell
P. B. Turpin
INVENTOR
William H. Wall.
BY Munn & Co
ATTORNEYS.

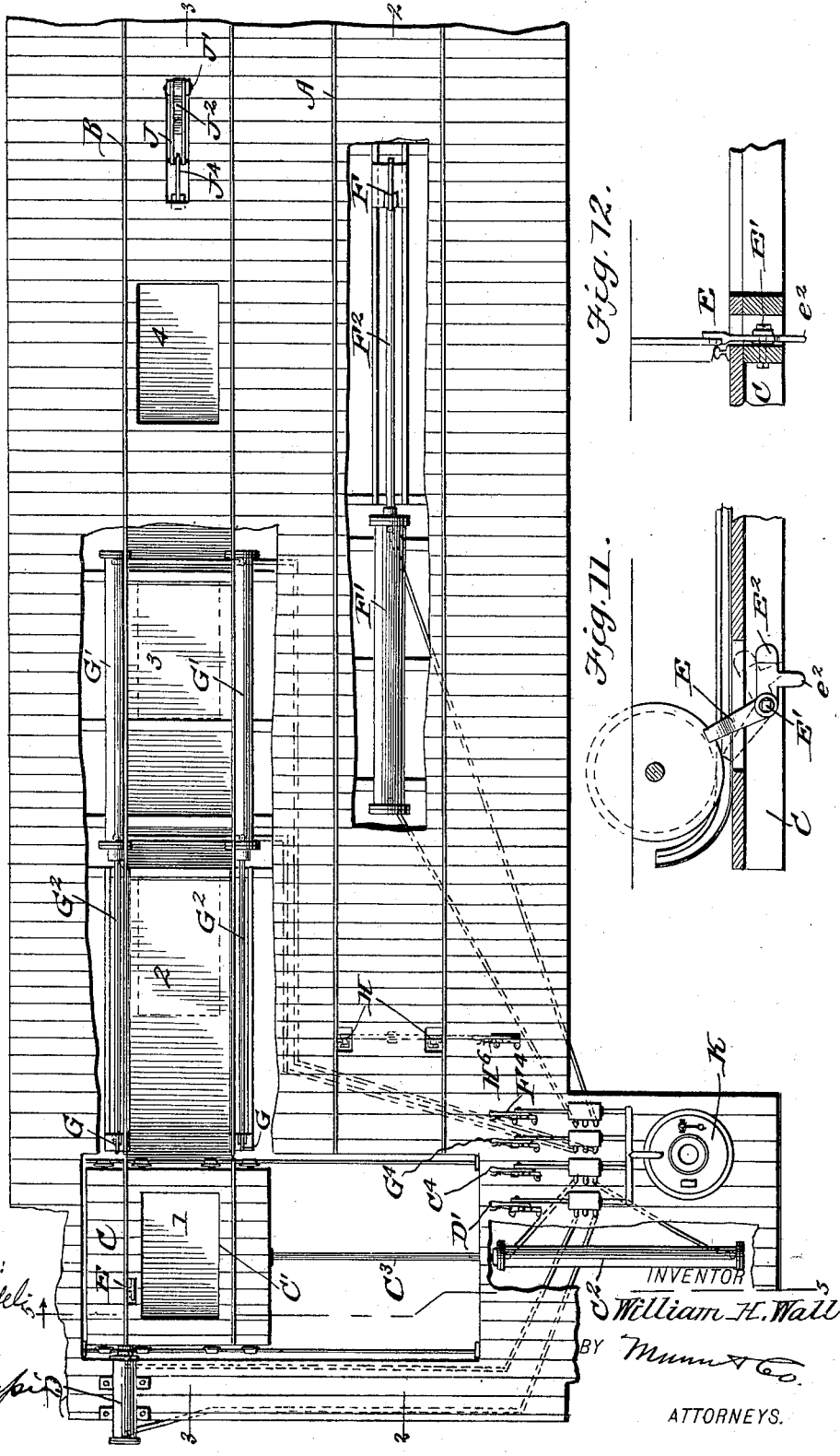

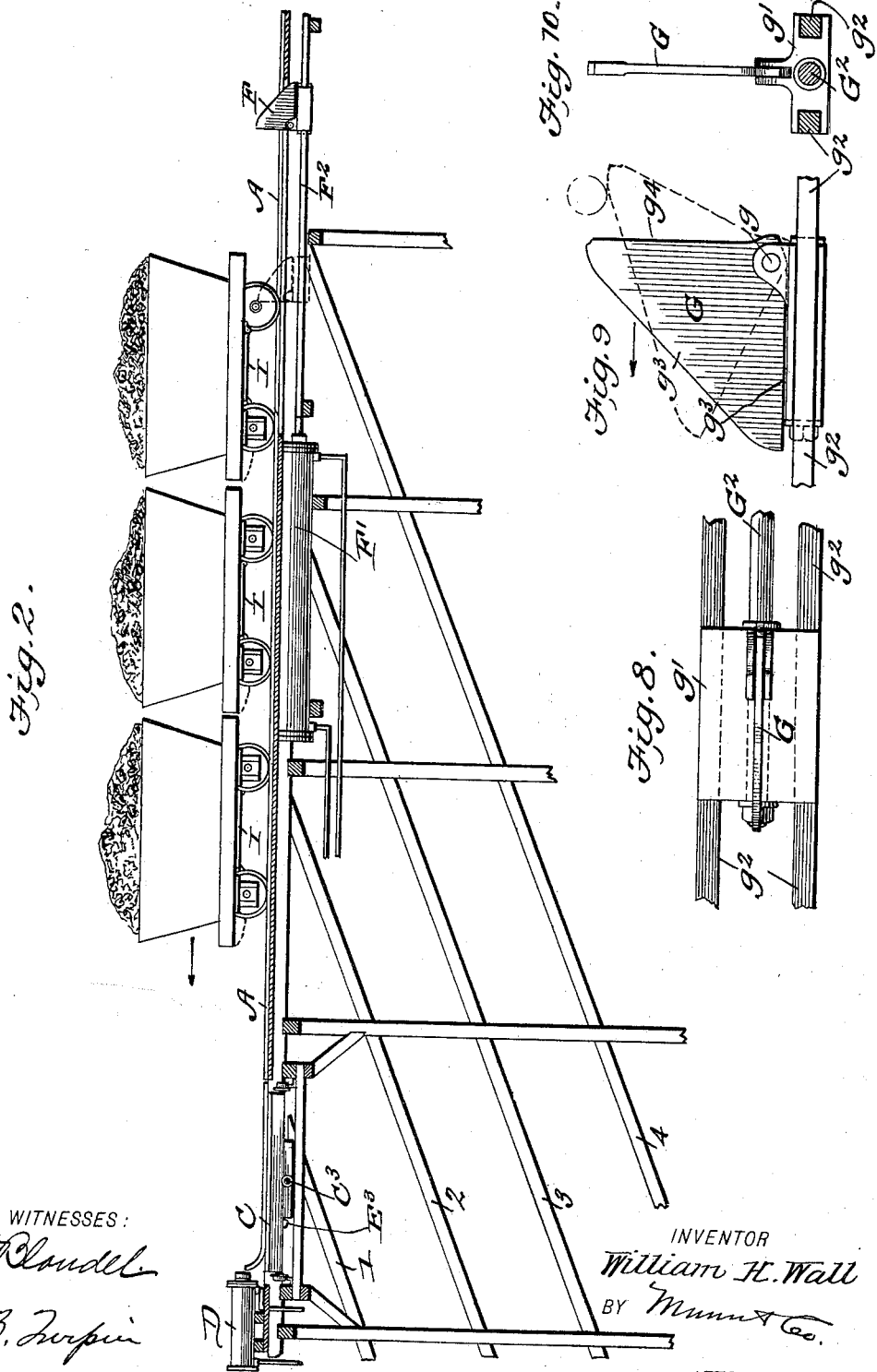

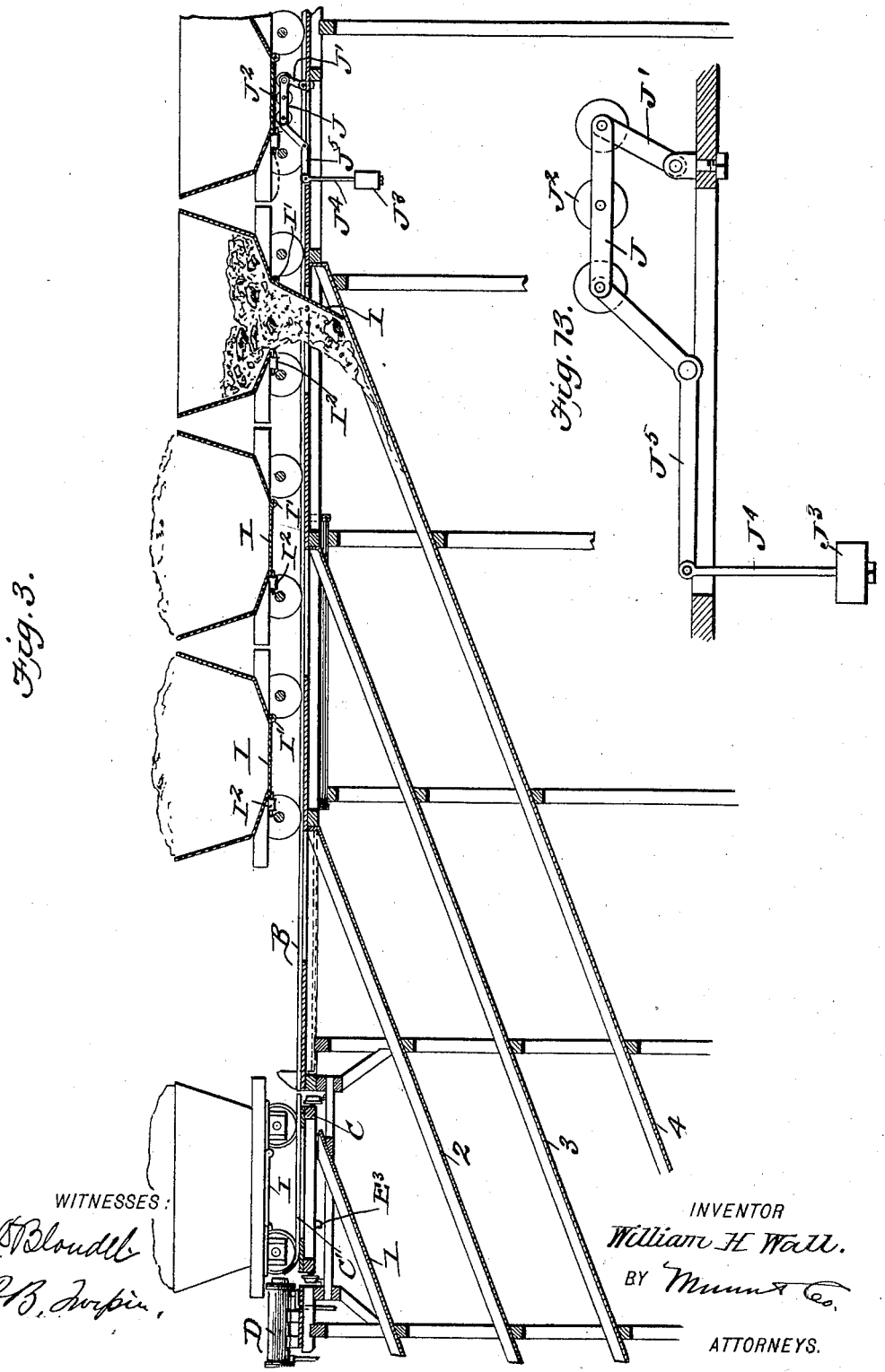

No. 628,876. Patented July 11, 1899.
W. H. WALL.
APPARATUS FOR HANDLING COAL.
(Application filed Feb. 7, 1899.)
(No Model.) 5 Sheets—Sheet 5.
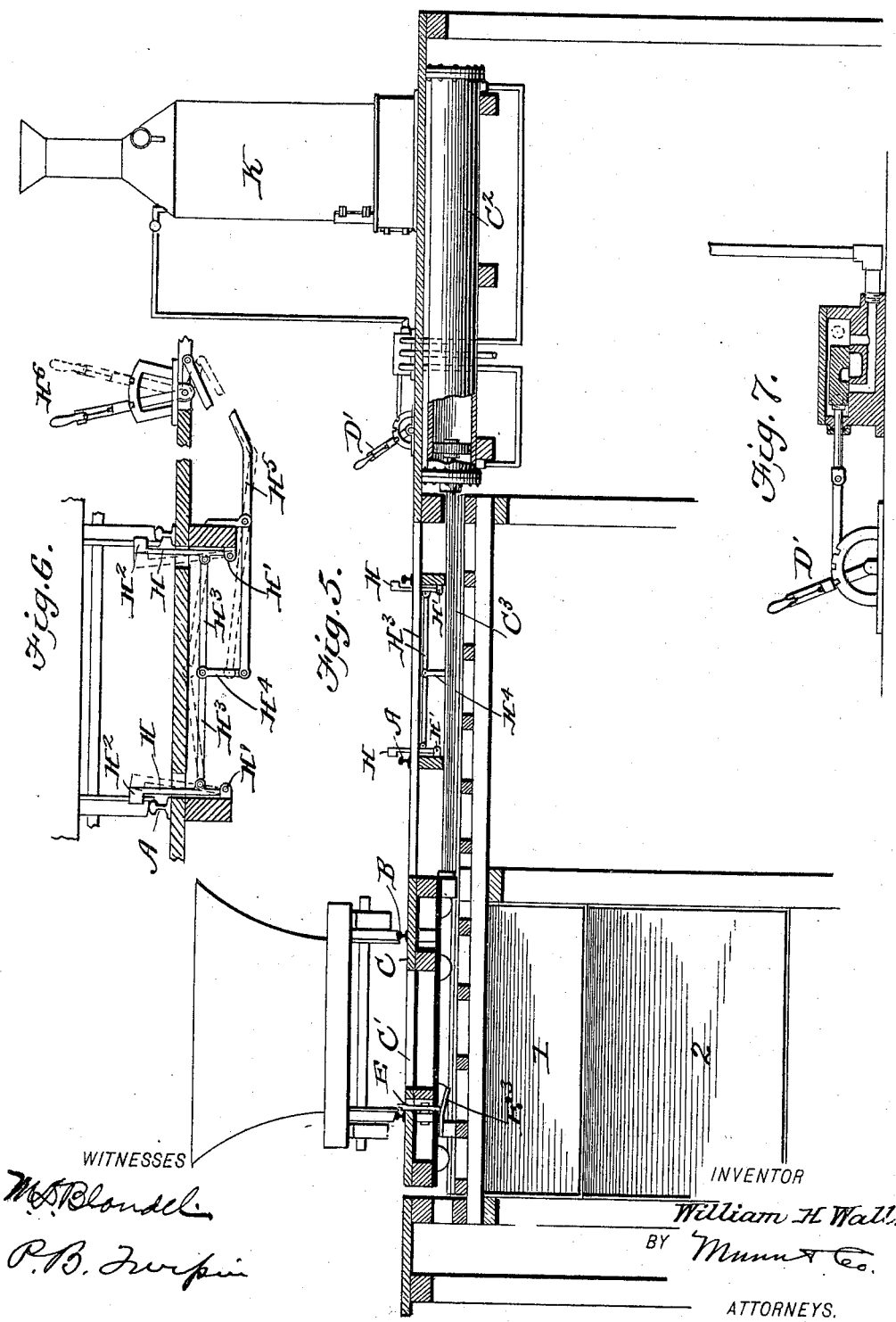
WITNESSES
INVENTOR
William H. Wall.
BY
ATTORNEYS.

United States Patent Office.

WILLIAM HENRY WALL, OF NANAIMO, CANADA.

APPARATUS FOR HANDLING COAL.

SPECIFICATION forming part of Letters Patent No. 628,876, dated July 11, 1899.

Application filed February 7, 1899. Serial No. 704,821. (No model.)

*To all whom it may concern:*

Be it known that I, WILLIAM HENRY WALL, residing at Nanaimo, British Columbia, Canada, have made certain new and useful Improvements in Apparatus for Handling Coal, of which the following is a full, clear, and exact specification.

My invention is an improvement in apparatus for use in handling cars; and it consists in certain features of construction and combinations of parts, as will be hereinafter described, and pointed out in the claims.

In the drawings, Figure 1 is a top plan view, partly broken away, of an apparatus embodying my invention in a loading-pier for shipping coal by vessels. Fig. 2 is a vertical longitudinal section on about line 2 2 of Fig. 1 through the feed or supply track. Fig. 3 is a vertical longitudinal section on about line 3 3 of Fig. 1 through the dumping-track. Fig. 4 is a side view of the apparatus, partly broken away. Fig. 5 is a cross-sectional view on about line 5 5 of Fig. 1. Fig. 6 is a detail view of the safety-stop. Fig. 7 is a detail view illustrating one of the valves for controlling the passage of steam or other power to the operating-cylinders; and Fig. 8 is a top plan view, Fig. 9 a side view, and Fig. 10 an edge view, of one of the grip-dogs used for moving the cars along the tracks. Fig. 11 is a side view, and Fig. 12 a sectional view, illustrating the catch for locking the car on the laterally-movable carriage; and Fig. 13 is a detail view of the gate-lifter.

In the construction shown I have presented the apparatus in the form of a loading-pier for shipping coal into vessels; but it is manifest that the invention is applicable in every direction where it is desired to transfer cars— such as in railway-stations, in mines both above and below ground, and elsewhere where it may be desired to move cars short distances, such as a car length or two at a time. Therefore I do not desire to be limited in the broad features of my invention to the special application of the same illustrated in the accompanying drawings.

I have shown tracks A and B, which for convenience of reference I term, respectively, the "supply-track" and the "dumping-track," it being the purpose of the special construction shown to move loaded cars on the track A from the right toward the left, transfer them at the left in Fig. 1 from the track A to the track B by the means presently described, and then move the cars along the track B to the desired point and dump their contents, as will be more fully described hereinafter. To transfer the cars from track A to track B, I provide the carriage C, which has a short track-section and is movable transversely to the tracks A and B, so its said track-section may be brought into register with either of said tracks A and B, as will be understood from Figs. 1 and 5. The carriage C has an opening C', through which coal may be dumped to the upper discharge-chute 1, chutes 2, 3, and 4 ranging below the chute 1, as shown in Figs. 2, 3, and 4.

The carriage C is moved from side to side by power acting in the cylinder $C^2$ upon the piston-rod $C^3$, which is connected with the carriage so it can move in both directions. The passage of pressure—it may be steam, compressed air, or other fluid—to the cylinder $C^2$ is controlled by the lever $C^4$, operating upon a suitable valve, which may be of the construction shown in Fig. 7 or of other suitable construction, as may be desired.

When the carriage C, with the car thereon, has been moved to the position shown in Figs. 1 and 5, the car may be forced off the carriage C onto the track B by a piston operating in the cylinder D, pressure to which cylinder D is controlled by a lever D', operating a suitable valve, which may be of the construction shown in Fig. 7. When the car is moved on the carriage C from the track A, it is locked by means of a catch E, (see Figs. 5, 11, and 12,) which is pivoted at E', has an arm movable to the position shown in Fig. 11 to chock the wheel, and is held normally in such position by its weighted arm $E^2$. This catch will lock the car on the carriage until the latter reaches the position shown in Fig. 5, where it registers with the track B, when the catch will be automatically released by the engagement of a portion $e^2$ of its arm $E^2$ with a cam-abutment $E^3$ on the framing, as will be understood from Figs. 11 and 12. This catch, it will be seen, locks the car securely on the carriage except when the track-section on the carriage coincides with the track B. At such time the car is released and may be forced by the power in the cylinder D off the carriage and onto the track B.

In the operation of the catch E it will when in the position shown in Fig. 11 chock the wheel of the car and hold such car on the carriage C until such carriage is adjusted to the position shown in Figs. 1 and 5, when the cam $E^3$, operating upon the portion $e^2$ of the arm $E^2$ of said catch E, will adjust the catch to the dotted-line position shown in Fig. 11, freeing the car, so it may move off the carriage C onto the track B.

For moving the cars along the track A and the track B, I provide grip-dogs which are alike in construction; but I use a single dog F in connection with the track A and a pair of dogs G in connection with the track B, it being desirable to arrange the dogs G in pairs and one at each side of the track and to similarly place the cylinders G' for the power which operates the piston-rods $G^2$, which move the dogs G, because the openings in the platform for the discharge of the coal to the chutes are arranged between the rails of the track B in the special construction illustrated in the drawings. The passage of pressure to the cylinders G' is controlled by the lever $G^4$, while the passage of pressure to the cylinder F' is controlled by the lever $F^4$, the piston-rod $F^2$ from the cylinder F' being suitably connected with its dog F, as will be understood from Fig. 1. The specific construction of the dogs F and G is the same and will be understood from Figs. 8, 9, and 10, in which I illustrate one of the dogs G, it being pivoted at $g$ to a cross-head $g'$, which slides on the guides $g^2$ and is connected with the piston-rod, which operates it. This dog has a broad base edge $g^3$, which rests upon the cross-head and makes the dog rigid against pressure against its upright edge $g^4$, but permits the dog to tilt under pressure against its inclined edge $g^5$, so the dog can act somewhat like a pawl, slipping beneath the axle of the car when the dog is moved in the direction of the arrow shown in Fig. 9, but binding against the axle to move the car when the dog is moved in a direction the reverse to that indicated by said arrow in Fig. 9. Thus, it will be seen, the grip-dogs G may be caused to move the cars from the left toward the right on the track B, while the dog F may be caused to move the cars along the track A from the right toward the left.

To prevent the cars from being moved along the track A except when the carriage C is in position to receive them, I provide the safety-stop shown in Figs. 1 and 6 and comprising the bars H, pivoted at one end H' and movable at their other ends $H^2$ into the path of the car-wheels, as shown in Fig. 6. The ends $H^2$ may have rubber cushions and move laterally into and out of the path of the wheels, being operated by the toggle-arms $H^3$, connected by link $H^4$ with one end of the lever $H^5$, which is operated and controlled by the hand-lever $H^6$, as will be understood from Figs. 1 and 6.

The chutes 1, 2, 3, and 4 are arranged to discharge at different levels, and the spout 5 may be raised by the cord 6 and adjusted by the cord 7 to properly register with any of said chutes and to discharge the coal thence into a vessel, the different chutes being useful in loading vessels of different heights and under different tide conditions.

The cars are moved back on the dumping-track to a position over the opening leading to the particular chute desired, and then the gates I in the bottom of said cars are opened, as shown in Fig. 3, and the coal is discharged onto the chute. The gates I are hinged at I', and a suitable latch $I^2$ is arranged to secure the free edge of the gate. This latch may be released in any suitable manner, and the gate may be closed after the car has been emptied. To so close the gate, I provide an automatic gate-lifter J, which is shown in Fig. 3 and consists of a suitable frame hinged at one end at J' and provided with a roller or rollers $J^2$ in position to engage the gate I, and the free end of the frame J is given tension by means of a weight $J^3$, connected by a pitman $J^4$ to the free end of the lever $J^5$, which forms a part of the gate-lifter. By this construction as the car, with its gate lowered, moves to the right (see Fig. 3) its gate will ride up on the lifter J and will be closed thereby. In such operation the yielding front end of the lifter J operates to relieve the blow of the gate against the lifter, as will be understood from Fig. 3.

I have shown in Figs. 4 and 5 the stationary boiler K for supplying steam to the several cylinders, but manifestly this may be supplied otherwise, or compressed air, or water, or other fluid pressure may be employed to operate the several pistons.

Having thus described my invention, what I claim, and desire to secure by Letters Patent, is—

1. In an apparatus substantially as described the combination of the supply-track, the dumping-track, the carriage for transferring the cars from the supply to the dumping track, the cylinder and piston for moving the said carriage, the dogs for moving the cars along the supply and discharge tracks, the cylinders and pistons for operating said dogs and means for controlling the supply of pressure to the several said cylinders substantially as set forth.

2. In an apparatus substantially as described, the combination of a tilting dog, a cross-head to which said dog is pivoted, guides for said cross-head and the cylinder and piston for operating the cross-head substantially as set forth.

3. In an apparatus substantially as described the combination with the track and the cars thereon of the tilting dog having a broad lower stop edge, an upright edge for operative engagement with the car, and an inclined edge arranged for engagement by the car whereby to tilt the dog substantially as set forth.

4. In an apparatus substantially as described, the combination of the two tracks, the carriage for transferring the cars from one track to the other, a catch for securing the car on said carriage and means for automatically releasing said catch substantially as set forth.

5. In an apparatus substantially as described, the combination with the track of the safety-stop consisting of the arms movable to a position to engage a car moving on the track, the toggle connecting said arms and means for operating the toggle whereby the said arms may be adjusted to and held out of position for engagement by the car substantially as set forth.

6. In an apparatus substantially as described, the gate-lifter whereby to close the drop-gates of the cars, such lifter consisting of a frame provided between its ends with a roller, a weight and a connection between said weight and frame whereby it may operate said frame substantially as set forth.

7. An apparatus substantially as described comprising the frame or platform having the supply and dumping tracks and having openings at intervals along the dumping-track, and provided with a series of chutes lying below said dumping-track, the carriage for transferring the cars from the supply-track to the dumping-track, the tilting gripping-dogs for moving the cars along the said tracks, the cylinders and pistons for operating said dogs, and the valves and operating means for controlling the passage of pressure to such cylinders substantially as set forth.

WILLIAM HENRY WALL.

Witnesses:
OLIVER RANDLE,
ROBERT WATSON.